Nov. 18, 1958   M. C. ANDERSON ET AL   2,860,565
SLIDE FOR RIGID SHANK CULTIVATOR
Filed Aug. 23, 1957
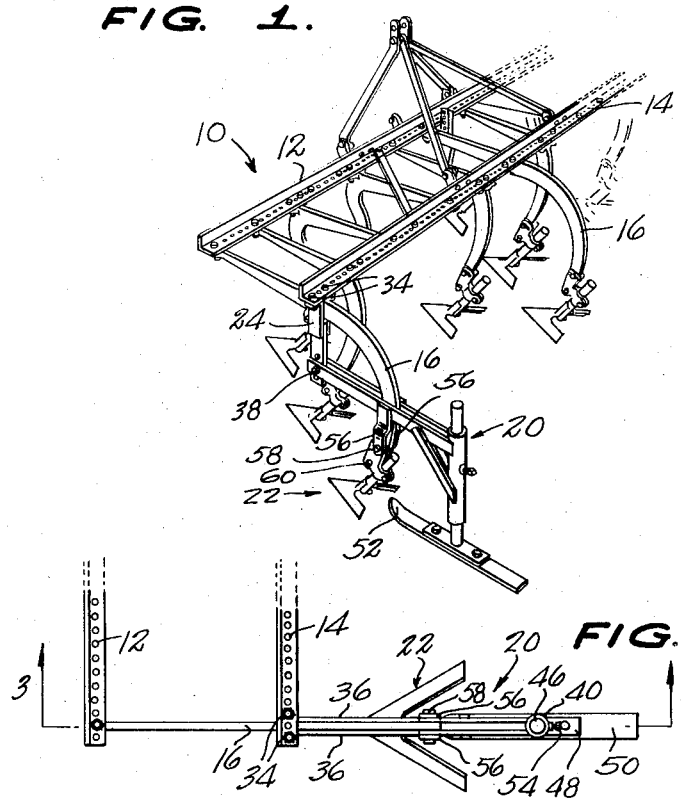
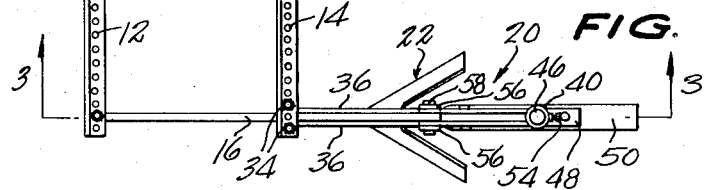
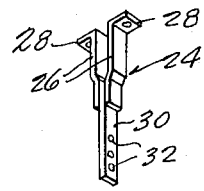
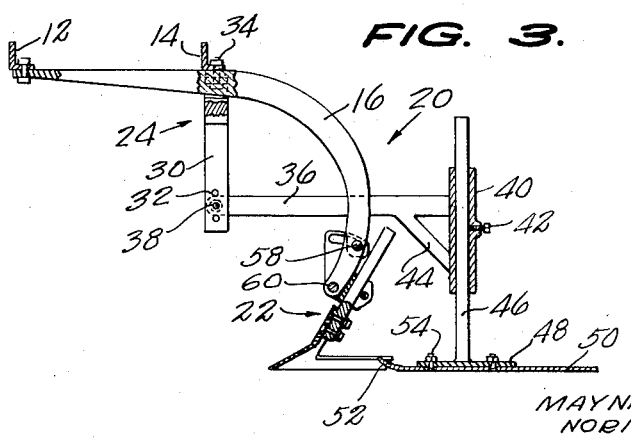
INVENTORS
MAYNARD C. ANDERSON,
NORMAN COLE,
BY
McMorrow, Berman + Davidson
ATTORNEYS.

United States Patent Office 2,860,565
Patented Nov. 18, 1958

2,860,565
SLIDE FOR RIGID SHANK CULTIVATOR

Maynard C. Anderson, Alma, and Norman Cole, Nicholls, Ga.

Application August 23, 1957, Serial No. 679,987

3 Claims. (Cl. 97—179)

This invention relates to improvements in rigid shank cultivators, and more particularly to an improved slide for association with one or more rigid cultivator shanks of such as a 3-point hitch cultivator.

The primary object of the invention is to provide a rigid cultivator shank and slide assembly, in the context indicated, which engages the earth behind the cultivator shank, during forward movement of the cultivator when planting or cultivating row crops, and acts to support the cultivator and preclude or reduce bobbing or washboard effect by the cultivator, even though related hoppers are filled to different capacities.

Another object of the invention is to provide a practical and efficient assembly of the character indicated above which can be quickly and easily removed from the cultivator frame and wherein the slide is readily replaceable at negligible cost, forward or rearward tilt of the slide can be easily and accurately adjusted to correspond with the adjustments of the cultivator, depth control can be easily adjusted, and wherein the slide can be easily and quickly removed or replaced in the assembly.

A further object of the invention is to provide an assembly of the character indicated above which can be made in rugged and serviceable forms at relatively low cost, is easily installed on a cultivator, and is generally satisfactory for its intended purposes.

Other important objects and advantageous features of the invention will be apparent from the following description and the accompanying drawings, wherein, for purposes of illustration rather than limitation, a specific embodiment of the invention is set forth in detail.

In the drawings:

Figure 1 is a rear perspective view of a portion of a cultivator, showing an assembly of the present invention installed thereon;

Figure 2 is a fragmentary top plan view of Figure 1;

Figure 3 is a fragmentary vertical longitudinal section taken on the line 3—3 of Figure 2; and Figure 4 is a perspective view of the mounting bracket.

Referring in detail to the drawings, wherein like numerals designate like parts throughout the several views, a three-point hitch cultivator, generally designated 10, comprises a frame having transversely elongated horizontal front and rear members 12 and 14, on which are mounted rigid cultivator shanks 16 having conventional plows 22 on their rearward ends.

A cultivator shank and slide assembly, generally designated 20, comprises at least one cultivator shank 16 on the lower rear end of which is mounted a plow assembly 22 which is adjustable as to height and as to forward and rearward inclination. The specific structure of such an adjustable plow, not being part of the present invention, except in combination therewith, is not described herein.

The assembly 20 further comprises a mounting bracket 24, shown clearly in Figure 4, which comprises laterally spaced vertical arms 26 having lateral flanges 28 on their upper ends, and a depending vertical bar 30 having therein a plurality of vertically spaced bolt holes 32. The flanges 28 engage the underside of the rear cultivator frame member 14 and are removably secured thereto by bolts 34. A pair of laterally spaced horizontal and rearwardly extending bars 36, together constituting a horizontal arm, are pivoted at their forward ends on a bolt 38 which is extended through a selected one of the bolt holes 32 in the depending bar 30.

Fixed to the rear ends of the bars 36 and positioned at right angles thereto is a vertical sleeve 40 which extends above and below the bars 36 and has a set screw 42 therein. A diagonal brace 44 extends between a bar 36 and a lower part of the sleeve 40.

Vertically slidable in the sleeve 40 and depending therebelow is a post 46 having fixed on its lower end a base plate 48. A flat elongated slide plate 50 having an upturned forward end 52 has an intermediate portion thereof engaged with the underside of the base plate 48 and is removably secured thereto by means of bolts 54. The post 46 is secured in the sleeve 40 by the set screw 42 to hold the slide plate 50 at the desired elevation relative to the plow or sweep assembly 22.

As shown in Figures 1 and 3, the horizontal bars 36 are located at opposite sides of and are engaged with the shank 16 and the shank 16 is positioned between the arms 26 of the bracket 24 above the depending bar 30.

Vertical bars 56 are fixed, as by welding, to the outer sides of the horizontal bars 36 in vertical alignment with the upper adjustment locking bolt 58 of the plow assembly 22 which tilts on the lower bolt 60 thereof, and the lower ends of the bars 56 are journalled on the outer ends of the locking bolt 58. As a result of this arrangement, the slide plate 50 is maintained in a horizontal position while the plow assembly has a desired angular adjustment relation to the horizontal, and the engagement of the slide plate 50 with the ground aids in supporting the frame of the cultivator 10 in a level position wherein the plow is prevented from digging and from vagrant up and down movements.

Although we have shown and described herein a specific form of our invention, it is to be understood that any change or changes in the structure of need in the relative arrangements of the components thereof are contemplated as being within the spirit and scope of the invention, as described by the claims appended hereto.

What is claimed as new is as follows:

1. In a cultivator, front and rear horizontal transverse members, a rearwardly and downwardly extending rigid shank secured to said members and extending rearwardly beyond said rear member and having a rear end, an adjustable plow assembly mounted on said rear end, a bracket secured to said rear member having arms positioned at opposite sides of said shank and having a bar depending below said shank in the region of the bracket, a horizontal arm having a forward end pivoted on said depending bar and a rear end, a vertical sleeve fixed on the rear end of said arm, a vertical post slidable in said sleeve and having a lower end below the sleeve and having thereon a mounting plate, a forwardly and rearwardly elongated ground engaging slide plate removably secured to the underside of the mounting plate and positioned behind and in line with the plow assembly, and means for securing said post in the sleeve in different vertically adjusted positions.

2. In a cultivator, front and rear horizontal transverse members, a rearwardly and downwardly extending rigid shank secured to said members and extending rearwardly beyond said rear member and having a rear end, an adjustable plow assembly mounted on said rear end, a bracket secured to said rear member having arms positioned at opposite sides of said shank and having a bar depending below said shank in the region of the bracket, a horizontal arm having a forward end pivoted on said depending bar and a rear end, a vertical sleeve fixed on the rear end of said arm, a vertical post slidable in said sleeve and having a lower end below the sleeve and having thereon a mounting plate, a forwardly and rearwardly elongated ground engaging slide plate removably secured to the underside of the mounting plate and positioned behind and in line with the plow assembly, and means for securing said post in the sleeve in different vertically adjusted positions, the forward end of said horizontal arm being vertically adjustable on said depending bar.

3. In a cultivator, front and rear horizontal transverse members, a rearwardly and downwardly extending rigid shank secured to said members and extending rearwardly beyond said rear member and having a rear end, an adjustable plow assembly mounted on said rear end, a bracket secured to said rear member having arms positioned at opposite sides of said shank and having a bar depending below said shank in the region of the bracket, a horizontal arm having a forward end pivoted on said depending bar and a rear end, a vertical sleeve fixed on the rear end of said arm, a vertical post slidable in said sleeve and having a lower end below the sleeve and having thereon a mounting plate, a forwardly and rearwardly elongated ground engaging slide plate removably secured to the underside of the mounting plate and positioned behind and in line with the plow assembly, and means for securing said post in the sleeve in different vertically adjusted positions, the forward end of said horizontal arm being vertically adjustable on said depending bar, said plow assembly having an upper transverse locking bolt and a lower transverse pivot bolt, with a plow pivoted on said pivot bolt and engaged with said locking bolt, and arms fixed on said horizontal bars and depending therefrom and journalled on said locking bolt.

References Cited in the file of this patent
UNITED STATES PATENTS

| | | |
|---|---|---|
| 796,267 | Tarver | Aug. 1, 1905 |
| 1,045,080 | Purnell | Nov. 19, 1912 |
| 2,649,722 | Raught | Aug. 25, 1953 |